Dec. 31, 1929.    C. L. JOHNSON    1,741,990
TRANSMISSION LOCK
Filed Oct. 31, 1927    2 Sheets-Sheet 1
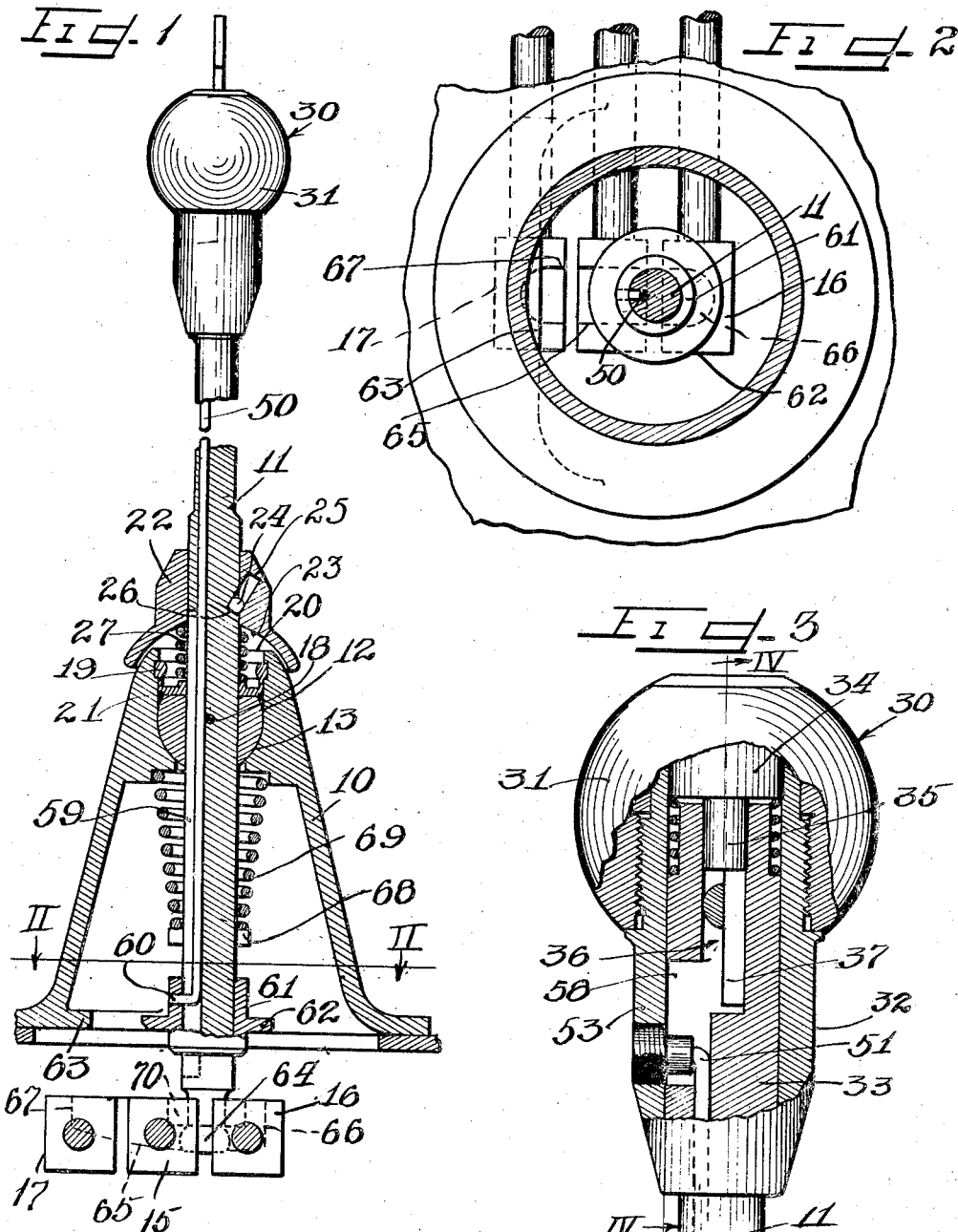
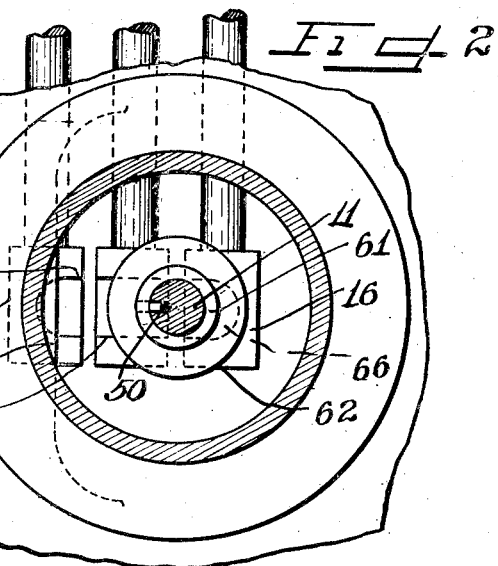
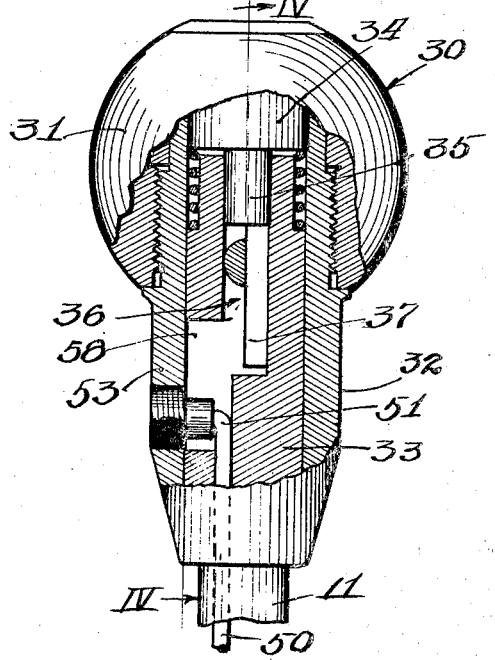
Inventor
Colvin L. Johnson
by

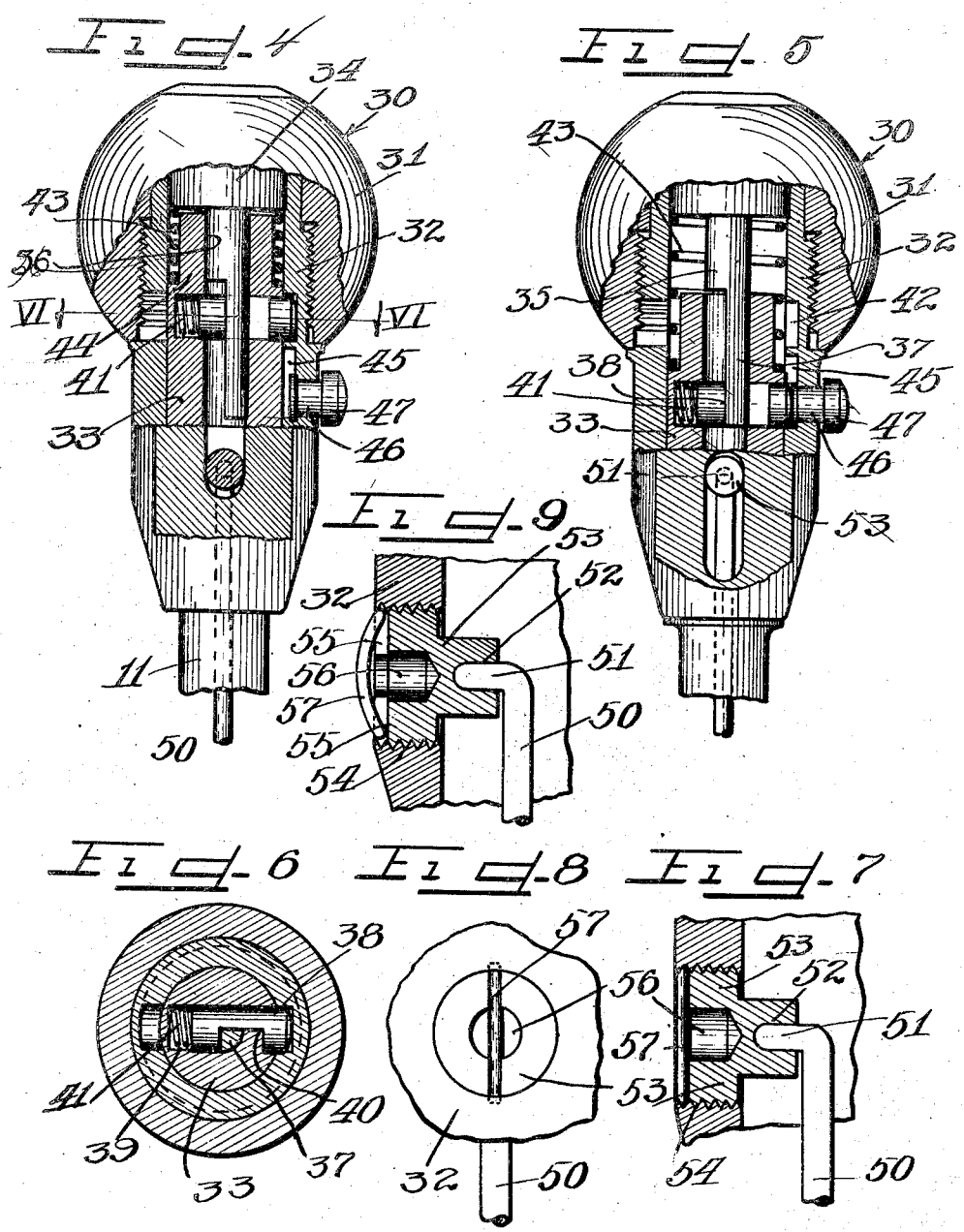

Patented Dec. 31, 1929

1,741,990

UNITED STATES PATENT OFFICE

COLVIN L. JOHNSON, OF ST. LOUIS, MISSOURI, ASSIGNOR TO JOHNSON AUTOMOBILE LOCK COMPANY, OF ST. LOUIS, MISSOURI, A CORPORATION OF MISSOURI

TRANSMISSION LOCK

Application filed October 31, 1927. Serial No. 230,161.

The present invention relates in general to transmission locks, and more particularly to a gear shift lever lock of the same general character as that disclosed in my co-pending patent application Serial No. 171,448, filed February 28th, 1927.

An object of my invention is to adapt a gear shift lever lock of the character disclosed in my aforesaid co-pending application to a four-speed transmission of conventional construction.

Another object of the invention resides in the provision of locking mechanism for a gear shift lever adapted to normally prevent the lever from operating the fourth speed shifting element of the transmission.

A further object of the invention is the provision of locking means for a gear shift lever normally arranged so that the lever is incapable of effecting a given gear change in the transmission and including means operable to render the lever capable of effecting the said change and also adapted upon a given movement to lock the gear shift lever in a neutral position.

A still further object of my invention is the provision of a gear shift lever lock of the same general character as that disclosed in my aforesaid co-pending patent application including a slidable handle on the upper end of the lever for controlling the operation of the locking mechanism, wherein the gear shift lever is normally rendered incapable of effecting a fourth speed change in the transmission and wherein a partial movement of the slidable handle will render the gear shift lever capable of operating this fourth speed change; the slidable handle being adapted upon a complete movement of the same to lock the lever in a neutral position.

Other objects and advantages of my invention will more fully appear from the following detailed description taken in connection with the accompanying drawings, which illustrate a single embodiment thereof and in which:

Figure 1 is a fragmentary sectional view partly in elevation illustrating my novel locking mechanism as applied to a gear shift lever;

Figure 2 is a plan view partly in section and elevation taken on substantially the line II—II of Figure 1 looking downwardly;

Figure 3 is a vertical sectional view partly in elevation through the slidable control handle on the upper end of the lever drawn to an enlarged scale;

Figure 4 is a fragmentary sectional view partly in elevation taken on substantially the line IV—IV of Figure 3 looking in the direction indicated by the arrows and showing the handle in its locked position;

Figure 5 is a sectional view similar to Figure 4 showing the handle in its unlocked position;

Figure 6 is a horizontal sectional view taken on substantially the line VI—VI of Figure 4 looking downwardly;

Figure 7 is an enlarged fragmentary sectional view of the screw used to anchor the operating rod extending through the lever to the slidable handle;

Figure 8 is a fragmentary front elevation of the structure shown in Figure 7 and illustrating the means for locking the screw against rotation, and Figure 9 is a view similar to Figure 7 showing how the locking element for preventing rotation of the screw is applied to the screw.

In the drawings:

Like reference characters designate similar parts throughout the several views.

The reference character 10 designates generally a support for a gear shift lever 11 having secured to an intermediate portion thereof a ball 12 mounted or seated on a spherical shoulder 13 formed in the support 10. The support 10 is tubular in construction and is anchored to the top of a transmission case 14 in which is disposed a conventional four-speed transmission including the ordinary shifter blocks 15 and 16 and an auxiliary shifter block 17 which may be termed the fourth speed block. Since the transmission per se does not constitute a part of the present invention except when taken in combination with the other elements of the construction shown in Figure 1, it is not thought to be necessary to describe in detail this transmission.

The ball 12 is secured to the lever by means of a pin 18 and is held on the seat 13 by means of a gasket or washer 19 secured in the recess 20 of the support or cover 10 directly above the ball 13. The ball 13 and the lever 11 are secured from longitudinal movement relative to the support 10 by means of a locking wire 21 inserted between the washer 19 and the top of the ball 13.

Access to the pivotal mounting of the lever is prevented by a cover member 22 which has a concave underside 23 and which is secured to the lever by means of a ball 24 disposed in a slot 25 in cover 22. This slot 25 is adapted to be aligned with a slot 26 formed in the lever 11 into which the ball 24 is adapted to extend. Positioned between the cover 22 and the washer 19 is a spring 27, one end of which abuts the arcuate underside 23 of cover 22, and the other end of which abuts the top of cup-shaped washer 19.

Mounted upon the upper end of the lever 11 is a slidable handle 30 including a hollow knob 31 threaded upon a sleeve 32 mounted upon the enlarged upper end 33 of lever 11. Mounted in the upper end of the sleeve 32 is a lock cylinder 34 including a downwardly extending plug 35 rotatable relative to the cylinder by means of a suitable key inserted into the cylinder. This lock cylinder 34 may be of any conventional construction. The plug 35 extends downwardly into a vertical recess 36 in the enlarged end 33 of lever 11 and has formed integral with its lower end an elongated eccentric portion 37 adapted to operate a horizontal locking bolt 38. The locking bolt 38 as best shown in Figure 6 is mounted in an opening 39 formed in the enlarged portion 33 of lever 11. This bolt 38 has formed in it a recess 40 through which the eccentric portion 37 of plug 34 extends. The bolt 38 is at all times urged toward the eccentric portion 37 by means of a spring 41 positioned in opening 39 having one end abutting a portion of the enlarged end 33 and having its other end abutting one end of the bolt 38.

When the bolt 38 is in its locked position, one of its ends is forced into a slot 42 formed in the inner surface of sleeve 32, as shown in Figure 4. Also it will be noted that when the handle member 30 is in this locked position shown in Figure 4, the spring 43 between cylinder 34 and the upper side of enlarged end 33 is compressed. Attention is also directed to the fact that the upper portion of enlarged end 33 of lever 11 is reduced, as indicated at 44, so as to enable the upper portion of the end 33 to partially telescope spring 43. The function of this spring 43 is to force the handle member 30 upwardly when the bolt 38 has been released from engagement with slot 42. When this happens, the handle member 30 moves to the position shown in Figure 5 wherein an end of the bolt 38 projects into a recess 45 formed in sleeve 32. It will be noted that this recess 45 is of substantially twice the width of plunger 38, thus permitting of a certain degree of movement of the handle member 30 relative to lever 11 without the necessity of moving the bolt 38 into its locked position previously described.

Extending into the recess 45 is a release pin 46, the inner end of which is adapted to abut the associated end of bolt 38. The outer end of this release pin 46 is provided with a button-head 47 adapted to be pressed manually to move the end of bolt 38 out of recess 45, whereby the slidable handle member 30 can be moved downwardly on lever 11 to bring the bolt 38 into register with recess 42 (Figure 4).

Extending thru the lever 11 is a rod 50 which may be termed an operating rod and which is controlled through the operation of handle member 30.

The upper end of this rod 50 is bent laterally and at right angles to the rod proper, as indicated at 51. This bent end of the rod extends into a recess 52 in a screw 53 threaded into an opening 54 in sleeve 32 of the handle member 30, (Figs. 7, 8 and 9). The outer end of screw 53 is provided with a pair of aligned slots 55 which cooperate to define a screw driver slot and by means of which the screw may be threaded into the opening 54. These aligned slots 55 are separated by a central recess 56 formed in the outer end of the screw 53. Mounted in the aligned slots 55 is a locking pin 57 for locking the screw against rotation in opening 54. This screw 53 and the locking means therefor comprise parts of my invention disclosed in my co-pending patent application Serial No. 230,162, filed October 31st, 1927.

In Figure 7 I have shown the pin 57 in its initial position prior to its being flexed into the aligned slots 55. When it is flexed into the slots 55 its ends are brought into cooperation with the thread of opening 54, as shown in Figure 7. Now, when it is desired to remove the screw 53 from the opening 54 all that has to be done is to press the pin 57 into the recess 56 so as to bring its ends out of cooperation with the thread. Thereafter the screw may be removed with facility from the opening 54.

In Figure 3 it will be observed that the internal end of screw 53 projects into the opening 58 formed in enlarged end 33 of lever 11 and which is shown as being disposed in communication with vertical recess 36 (Fig. 3). It will be evident that inasmuch as the screw 53 is secured to the slidable sleeve 32 of handle member 30 it necessarily follows that an opening such as the recess 58 must be provided in the enlarged end 33 of lever 11, or otherwise it would not be possible to move this sleeve relative to the lever. Moreover, inasmuch as the rod 50 is secured to sleeve 32 the rod 50 must move with the sleeve 32.

The rod 50 extends downwardly through the gear shift lever 11. The lower portion of the lever 11 is provided with a slot 59 through which the rod extends. The extreme lower end of rod 50 is bent at right angles to the rod as indicated at 60 (Fig. 1). This bent end 60 of the rod is anchored to the collar 61 slidably mounted upon the lower end of lever 11. Formed integral with this collar 61 is an enlarged flange 62 which, when it is in the position shown in Figure 1 is adapted to strike a projection 63 (Figs. 1 and 2) formed integral with the lower part of support 10. Obviously in order to increase the range of movement of the lower end of lever 11 it is necessary that the collar 61 be lowered so that its flange 62 is moved out of the horizontal plane in which the projection 63 is disposed.

The extreme lower end of lever 11 is provided with a reduced portion 64 disposed in slots 65 and 66 in blocks 15 and 16 respectively, and adapted to cooperate with these blocks in the shifting of the gears in the transmission.

It will be noted from Figures 1 and 2 that the slot 65 in block 15 is disposed in alignment with slot 67 in the fourth speed block 17. This means that when the flange 62 of collar 61 is moved out of the plane of projection 63 it is possible to move the lower end 64 of the lever 11 into slot 67 of block 17. Also it is to be noted that the two blocks 15 and 16 cooperate to define a recess 70 adapted to receive the lower end of collar 61 when the collar is moved to its lowermost position. Now it will be evident that when the collar is disposed in the recess 70 the lever 11 will be locked in a neutral position so that it is incapable of operating either of the blocks 15 or 16.

Secured to the lower end of lever 11 is a washer 68 which defines a lateral shoulder. Positioned between this shoulder and upper portion of support 10 is a compression spring 69 which tends to at all times urge the lever downwardly into cooperation with the blocks 15 and 16. The operation of my novel locking mechanism is briefly as follows:

As previously pointed out, when the transmission is in an unlocked condition the handle member 30 is disposed in the position shown in Figure 5. Obviously, when the handle member is in this position the collar 61 will be in the position shown in Figure 1. This means that lever 11 may be moved to actuate either of the shift blocks 15 or 16.

Now in the event it is desired to effect a fourth speed change in the transmission it is necessary to move the flange 62 below the horizontal plane of the projection 63. This may be accomplished by pressing downwardly on the handle member 30, thus causing the end of the locking bolt 38 to be positioned in the upper part of slot 45 (Fig. 5). This movement of the handle member, however, does not cause the lever 11 to be locked against operation inasmuch as the movement is not great enough to cause collar 61 to be moved into recess 70 of the two blocks 15 and 16 (Fig. 1). Moreover this slight downward movement of the handle 30 causes the spring 43 to be slightly compressed so that upon the release of the handle member 30, the handle member will be forced upwardly to its normal unlocked position.

When it is desired to lock the gear shift lever 11 against movement the same may be accomplished by contemporaneously pressing downwardly on the handle member 30 and by pressing inwardly on the button 47 to move the locking bolt 38 out of recess 45. Once the bolt has been moved out of the recess 45 the handle member 30 can be pushed downwardly relative to the lever 11 until the end of the locking bolt snaps into the recess 42. It will be noted from Figure 4 that when the handle member is in this locked position the spring 43 is compressed. The downward movement of the handle member 30 also causes rod 50 to move downwardly. Moreover since the collar 61 is secured to the lower end of the rod 50 the collar will move downwardly with the rod. This means that the lower end of the collar will be moved into the recess 70 in the two shift blocks 15 and 16 and the lever 11 will hence be locked in a neutral position. The collar 61 can be elevated from the recess 70 (Fig. 1), by inserting a key in the locked cylinder and releasing the locking bolt 38 from the recess 42 whereby the spring 43 can become effective to return the handle member 30 and the parts connected thereto to the unlocked position shown in Figure 5.

Now I desire it understood that although I have illustrated and described in detail the preferred form of my invention, the invention is not to be thus limited but only in so far as defined by the scope and spirit of the appended claims.

I claim as my invention:

1. In combination, a gear shift lever, a support for said gear shift lever, a slidable locking element connected to the lower end of said lever, means connected to the lower end of said support for limiting the lateral movement of the lower end of said lever and means for lowering said locking element on said lever to permit of a greater range of movement on the part of the lower end of said lever.

2. In combination, a gear shift lever, a support for said gear shift lever, a slidable locking element connected to the lower end of said lever, means connected to the lower end of said support for limiting the lateral movement of the lower end of said lever, means for lowering said locking element on said lever to permit of a greater range of movement on the part of the lower end of said lever, said means for lowering the lever including a rod extending through the lever and a slidable sleeve disposed on the upper end of the lever for actuating said rod.

3. In combination, a gear shift lever, a support for said gear shift lever, a slidable locking element connected to the lower end of said lever, means connected to the lower end of said support for limiting the lateral movement of the lower end of said lever, means for lowering said locking element on said lever to permit of a greater range of movement on the part of the lower end of said lever, said latter means including a rod extending through the lever and lock means connected to the upper end of said rod for controlling the movement of the same, said lock means being also adapted to actuate said locking element to lock said lever in a neutral position.

4. In combination, a gear shift lever, a support for said gear shift lever, a slidable locking element connected to the lower end of said lever, means connected to the lower end of said support for limiting the lateral movement of the lower end of said lever, means for lowering said locking element on said lever to permit of a greater range of movement on the part of the lower end of said lever, said latter means including a rod extending through the lever and a slidable handle connected to the upper end of the lever for actuating said rod, said slidable handle including locking means adapted to be moved to its locked position when said locking element is moved into a position wherein the lever is locked in a neutral position, said locking means being so arranged that a limited degree of movement of said handle member to move said locking element a slight distance will not actuate it.

5. In combination, a gear shift lever, a support for said lever, a locking element mounted upon the lower end of the lever, means connected to the support for limiting the lateral movement of the lower end of the lever by engaging said locking member and a slidable handle member mounted upon the upper end of the lever for actuating said locking element and for locking said lever in a neutral position, said handle member being adapted upon a slight movement to move said locking element clear from said means connected to said support whereby the lever is capable of a greater degree of lateral movement.

6. In combination, a gear shift lever, a support for said gear shift lever, a slidable locking element connected to the lower end of said lever, means connected to the lower end of said support for limiting the lateral movement of the lower end of said lever and means for lowering said locking element on said lever to permit of a greater range of movement on the part of the lower end of said lever, said latter means including a key-operated lock adapted to lock said locking element in a given position whereby the lever may be locked against operation.

7. In combination, a gear shift lever, a support for said lever and slidable handle member telescoped by the upper end of said lever, a lock associated with said handle member for locking it against movement, means associated with the lower portion of said lever adapted to lock said lever against movement, means operatively connecting said lock to said lower means, and means connected to said support adapted to engage said locking means on the lower portion of the lever to limit the lateral movement of said lever, said handle member being adapted upon a slight movement thereof to move said lower locking means clear of the means on the support whereby the lever is permitted to have a greater range of movement.

8. In combination, a transmission including a plurality of shiftable elements, a gear shift lever for selectively operating said elements, locking means associated with said lever for locking the lever in a given position, and means for cooperation with said locking means when the latter is in a given position to prevent said lever from operating a given shiftable element in said transmission without interfering with the operation of another of said shiftable elements.

9. In combination, a transmission including a plurality of shiftable elements, a gear shift lever for selectively operating said elements, locking means associated with said lever for locking the lever in a given position, and means cooperable with said locking means when the latter is in an unlocked position to prevent the operation of one of said shiftable elements by said lever, said locking means being movable out of cooperation with said other means to enable said lever to operate said shiftable elements.

10. In combination, a transmission including a plurality of shiftable elements, a gear shift lever associated with said transmission for actuating said elements, locking means for locking said lever against operation, and means associated with the lower portion of said lever cooperable with said locking means when the latter is in an unlocked and given position to limit the range of movement of said lever to prevent said lever from operating a given element, said locking means being movable from said given position into another position to increase the range of movement of said lever whereby said lever is rendered capable of operating any one of said shiftable elements.

In testimony whereof I have hereunto subscribed my name at St. Louis, Missouri.

COLVIN L. JOHNSON.